(12) United States Patent
Oberski et al.

(10) Patent No.: US 8,209,961 B2
(45) Date of Patent: *Jul. 3, 2012

(54) ENGINE-OFF AMMONIA VAPOR MANAGEMENT SYSTEM AND METHOD

(75) Inventors: Christopher Oberski, Plymouth, MI (US); Giovanni Cavataio, Dearborn, MI (US); Michiel J. Van Nieuwstadt, Ann Arbor, MI (US); Timothy Webb, Ann Arbor, MI (US); William Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

This patent is subject to a terminal disclaimer.

(21) Appl. No.: 12/790,621

(22) Filed: May 28, 2010

(65) Prior Publication Data

US 2010/0236219 A1 Sep. 23, 2010

Related U.S. Application Data

(63) Continuation of application No. 11/532,867, filed on Sep. 18, 2006, now Pat. No. 7,726,118.

(51) Int. Cl.
 *F01N 3/00* (2006.01)
(52) U.S. Cl. ............... 60/286; 60/274; 60/293; 60/295; 60/297; 60/303
(58) Field of Classification Search .............. 60/274, 60/286, 289, 292, 293, 295, 297, 301, 303
See application file for complete search history.

(56) References Cited

U.S. PATENT DOCUMENTS

| 3,657,878 | A | 4/1972 | Kaufmann, Jr. |
| 4,314,345 | A | 2/1982 | Shiraishi et al. |
| 4,334,756 | A | 6/1982 | Michlin et al. |
| 5,369,956 | A | 12/1994 | Daudel et al. |
| 5,809,775 | A * | 9/1998 | Tarabulski et al. ............... 60/274 |
| 5,943,858 | A | 8/1999 | Hofmann et al. |
| 6,387,336 | B2 | 5/2002 | Marko et al. |
| 6,470,673 | B1 | 10/2002 | Van Nieuwstadt et al. |
| 6,620,391 | B2 | 9/2003 | Müller et al. |
| 6,637,196 | B1 | 10/2003 | Tost |
| 6,810,661 | B2 * | 11/2004 | Lambert et al. ................. 60/286 |
| 6,837,041 | B2 * | 1/2005 | Hernier ........................... 60/286 |

(Continued)

FOREIGN PATENT DOCUMENTS

WO 2004042207 A1 5/2004

(Continued)

OTHER PUBLICATIONS

Lambert et al., "Urea SCR and CDPF System for Diesel Sport Utility Vehicle," Meeting Tier 2 Bin 5, Presented in Coronado, California, Sep. 2, 2004, 8 pages.

*Primary Examiner* — Binh Q Tran
(74) *Attorney, Agent, or Firm* — Julia Voutyras; Alleman Hall McCoy Russell & Tuttle LLP

(57) ABSTRACT

A method of managing vapors generated from an ammonia-containing reductant delivery system for a vehicle is described. The method may include storing ammonia containing vapors generated in the reductant delivery system during engine-off and then purging said stored ammonia into an exhaust of the engine to react in a catalyst in the exhaust flow during engine operation.

18 Claims, 10 Drawing Sheets

U.S. PATENT DOCUMENTS

| | | | |
|---|---|---|---|
| 6,928,807 B2 * | 8/2005 | Jacob et al. | 60/286 |
| 7,017,335 B2 * | 3/2006 | Huber et al. | 60/286 |
| 7,467,512 B2 * | 12/2008 | Nishina et al. | 60/286 |
| 7,640,896 B2 * | 1/2010 | Nazri | 123/3 |
| 7,726,118 B2 * | 6/2010 | Oberski et al. | 60/286 |
| 2004/0098976 A1 | 5/2004 | Van Nieuwstadt et al. | |
| 2004/0258594 A1 | 12/2004 | Andreasson et al. | |
| 2005/0129599 A1 | 6/2005 | Berriman et al. | |
| 2005/0198943 A1 | 9/2005 | Breuer et al. | |
| 2005/0247050 A1 | 11/2005 | Kaboord et al. | |
| 2005/0282285 A1 | 12/2005 | Radhamohan et al. | |
| 2006/0117741 A1 | 6/2006 | Mayer et al. | |
| 2006/0174608 A1 | 8/2006 | Hu et al. | |
| 2007/0036694 A1 | 2/2007 | Nishioka et al. | |
| 2007/0051096 A1 | 3/2007 | Pfeifer et al. | |
| 2007/0277505 A1 | 12/2007 | Dawson et al. | |

FOREIGN PATENT DOCUMENTS

WO    2006087553 A1    8/2006

* cited by examiner

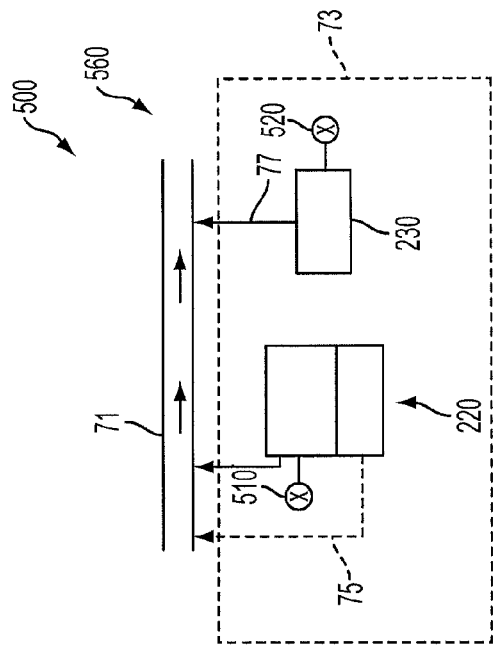
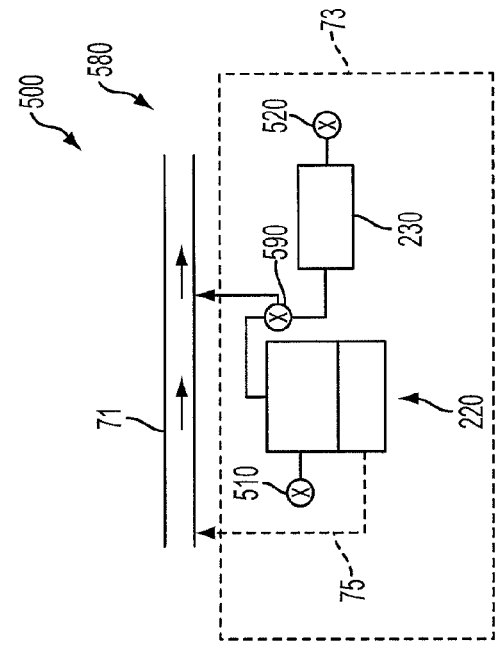
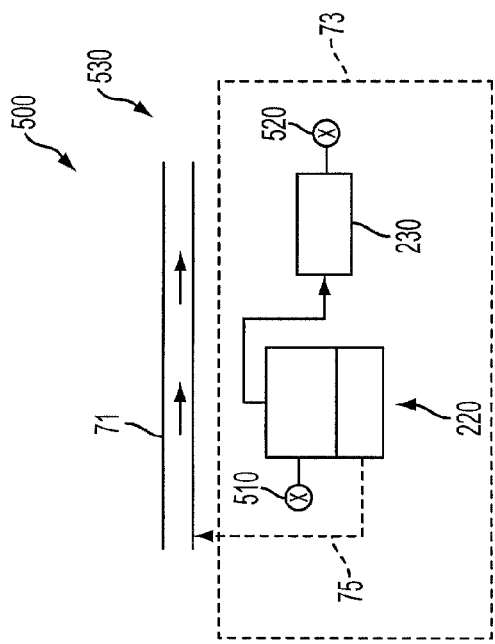
FIG. 5A  FIG. 5B  FIG. 5C  FIG. 5D

ENGINE-OFF AMMONIA VAPOR MANAGEMENT SYSTEM AND METHOD

CROSS REFERENCE TO RELATED APPLICATION

The present application is a continuation of U.S. patent application Ser. No. 11/532,867 filed on Sep. 18, 2006, the entire contents of which are incorporated herein by reference.

BACKGROUND AND SUMMARY

Ammonia or urea may be stored on-board a vehicle for use as a reductant in exhaust emission control systems.

Under some conditions, such as during engine starting, ammonia vapor that was generated in the reductant system may be used, such as described in U.S. 2006/0117741. For example, ammonia vapors may be routed to a storage unit and a reactor that uses exhaust heat or electrically generated heat. Further, the vapors may also be directed to the exhaust gas to react with exhaust gas NOx in a catalyst in the exhaust flow.

However, the inventors herein have recognized several issues with such a system. For example, ammonia vapors may be generated during various increased temperature conditions, possibly increasing pressure in the system and enabling ammonia to escape to the atmosphere without being reacted in the exhaust. For example, after an engine shut-down and when the vehicle may be parked in an enclosed area, residual heat and ambient heat may substantially increase vapor pressure, and possibly escape un-metered from the reductant system, either through the exhaust or through other passages.

Thus, in one approach, a method of managing vapors generated from an ammonia-containing reductant delivery system for an engine of a vehicle may be used. The method comprises during at least a portion of engine-off conditions, storing ammonia containing vapors generated in the reductant delivery system, and after said storing and during at least a portion of engine operation, purging said stored ammonia into an exhaust of the engine to react in a catalyst in the exhaust flow.

In this way, it may be possible to reduce vapor pressures and reduce un-metered ammonia exiting the system. Further, by later use of the stored ammonia in the exhaust, more effective usage rates of ammonia (or urea) may be achieved, possibly reducing the amount or frequency of ammonia (or urea) that is added by a user.

Note that various forms of shut-down may be possible, such as temporary engine shut-downs due to vehicle stop-start operation, temporary engine shut-downs due to hybrid vehicle operation, or complete vehicle shut-downs.

DESCRIPTION OF DRAWINGS

FIGS. 5A-D are schematic representations of a group of supply and storage modes for a reductant management system.

DETAILED DESCRIPTION OF THE DEPICTED EMBODIMENTS

The accompanying figures and this description depict and describe various exemplary embodiments of a system for managing a plurality of reductants for use in an SCR process. The embodiments described herein include a first storage device for storing a first reductant that is added to the exhaust system upstream of a catalyst for the reduction of various engine emissions. Under certain conditions, the first reductant may react with atmospheric components such as water vapor, and/or may decompose, to form a second reductant. Over time, pressures of the second reductant in the first storage device may become elevated, which may cause an uncontrolled release of the second reductant from the first storage device. To help prevent such release, the embodiments described herein also include a second storage device for storing the second reductant. The second reductant stored in the second storage device may be used at least temporarily in parallel with, or separately from, the first reductant to treat exhaust gases from an internal combustion engine. In this way, the system may be capable of avoiding the uncontrolled release of the second reductant into the exhaust system.

Figure 1:
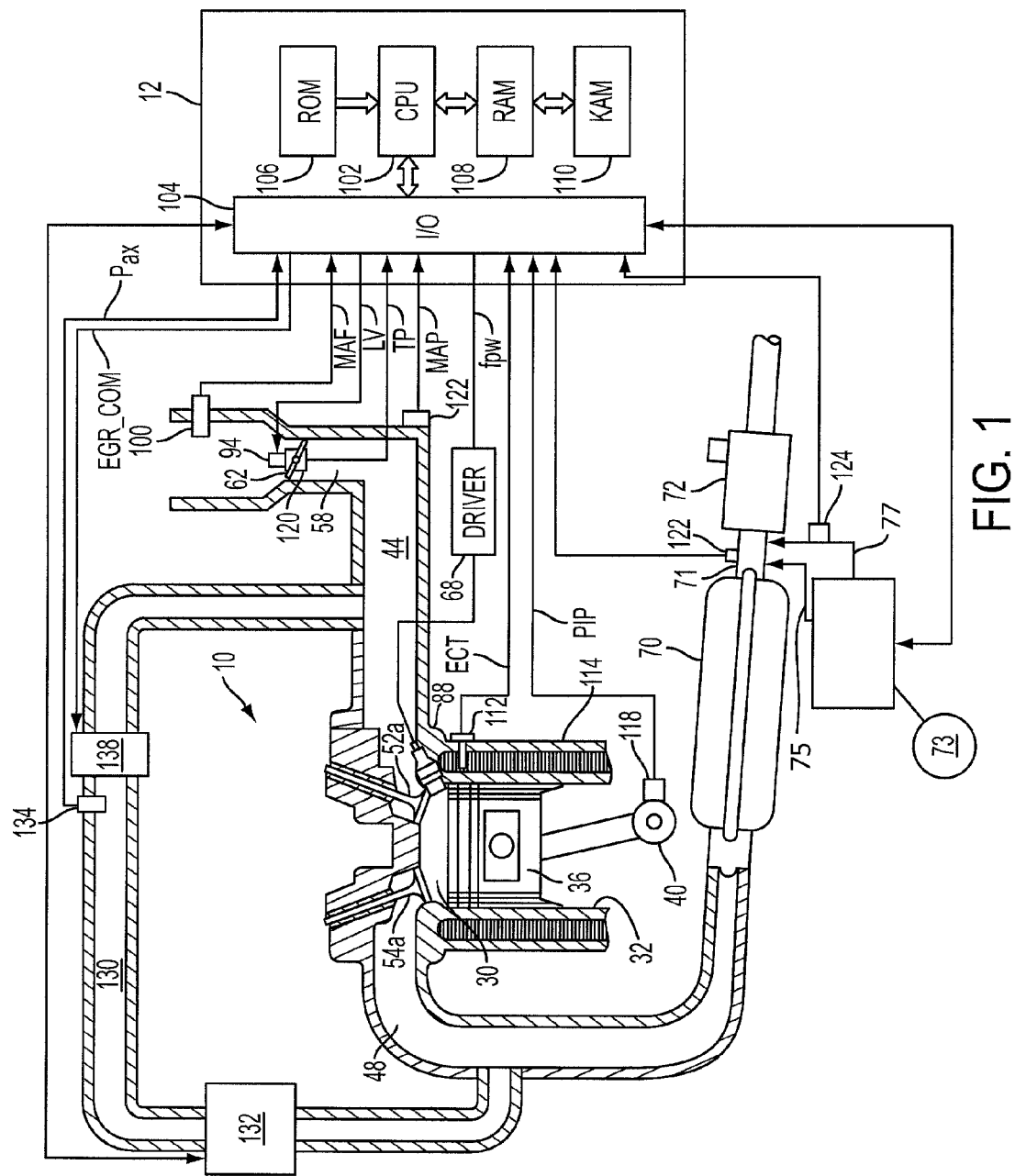
FIG. 1 shows an exemplary embodiment of an internal combustion engine and control system.

Referring now to FIG. 1, direct injection internal combustion engine 10, comprising a plurality of combustion chambers and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Further, exhaust gas recirculation (EGR) manifold 130 is shown communicating with exhaust manifold 48 and intake manifold 44. EGR cooler 132 is shown communicating with controller 12 for cooling the EGR prior to reaching the intake manifold 44. Also shown is EGR control valve 136 for controlling the flow of EGR and pressure sensor 134 for monitoring the pressure of the exhaust within the EGR manifold 130.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

A catalytic converter 70 is shown in communication with exhaust manifold 48, and an SCR catalyst 72 is shown positioned downstream of catalytic converter 70. A reductant source 73 is provided for introducing one or more reductants into the exhaust system 71 upstream of SCR catalyst 72 upon direction by controller 12. Reductant source 73 may be configured to introduce a plurality of reductants into the engine exhaust, as indicated by first reductant input 75 and second reductant input 77. This feature is described in more detail below.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Controller 12 may also receive a signal related to an exhaust NOx concentration from a NOx sensor 122 positioned upstream of SCR catalyst 72, and/or a signal from an ammonia sensor 124 related to an ammonia concentration in a reductant added from reductant source 73. Engine speed signal RPM is generated by controller 12 from signal PIP in a conventional manner and manifold pressure signal MAP provides an indication of engine load.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, H2, ethanol, methane, and/or combinations thereof may be used.

Figure 2:
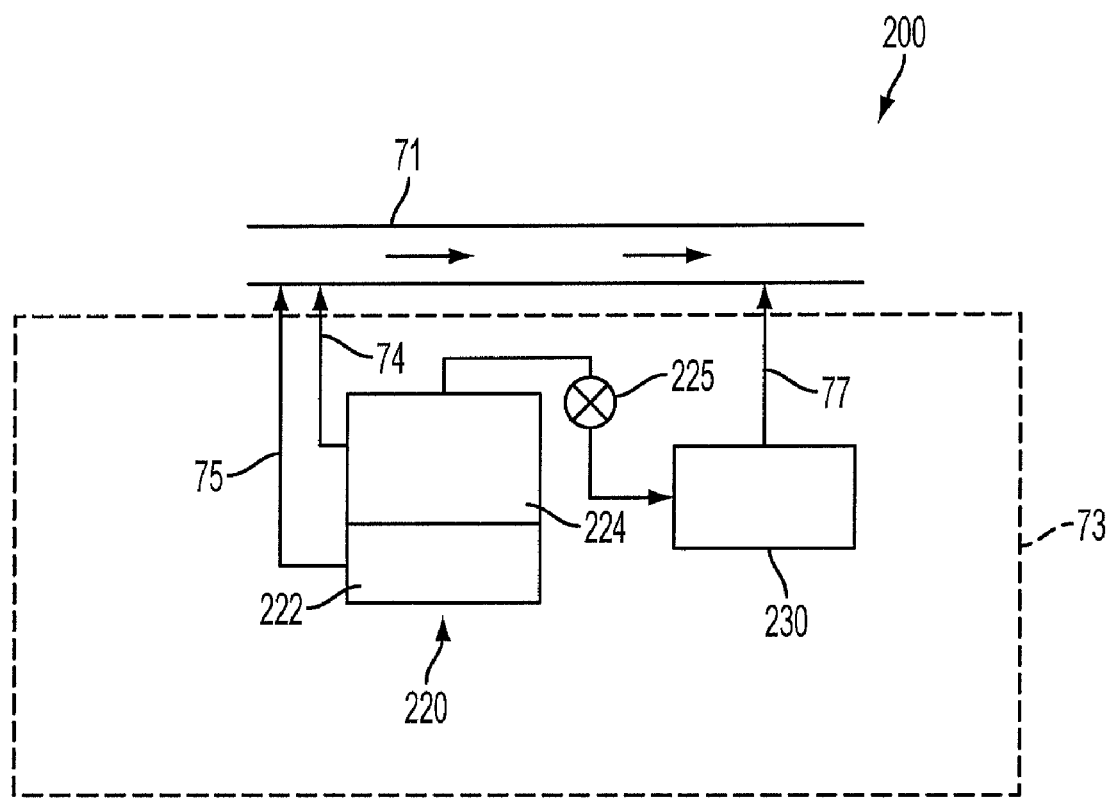
FIG. 2 shows an exemplary embodiment of a system for managing a plurality of reductants for use in an SCR process.

FIG. 2 shows a block diagram of an example of emissions control system 200 of engine 10 in more detail. Emissions control system 200 includes exhaust system 71 and reductant source 73. As described below, reductant source 73 may manage the storage and utilization of a plurality of reductants. Reductant source 73 may be referred to herein as a reductant management system. While FIG. 2 shows one specific reductant management system, various alternatives may be used, such as alternatives shown by the examples described herein.

Reductant management system 73 is shown coupled to exhaust system 71 at a location upstream of a catalytic converter (not shown in FIG. 2), such as an SCR catalytic converter. Further, one or more reductants may enter exhaust system 71 via conduit or 75, line 74, and/or line 77 or some combination thereof. Reductant management system 73 includes a first storage device 220 for storing a quantity of a first reductant 222. Depending upon the chemical and physical properties of first reductant 222, under certain conditions, first reductant 222 may react (for example, with atmospheric components) or decompose to form a second reductant 224.

Over time (e.g., during vehicle operation or during engine/vehicle shut-down), the production of second reductant 224 may cause an increase in vapor pressure within first storage device 220. Therefore, to assist in controlling pressure within first storage device 220 or within system 73, at some vapor pressure a pressure relief valve 225 may be configured to release a quantity of second reductant 224 into a second storage device 230, although second reductant 224 may be released directly into the exhaust stream through line 74. Second storage device 230 likewise may be configured to release controlled quantities of second reductant 224 into exhaust system 71 through line 77. In this manner, reductant management system 73 may allow controlled quantities of both the first and second reductants to be released into exhaust system 71 wherein at least one of the reductants may react at a downstream catalyst, such as an SCR catalyst, for example. Further the release may be concurrent, separate, or some combination thereof.

In some embodiments, first reductant 222 stored in first storage device 220 may be aqueous urea. First storage device 220 may include a storage tank for the example embodiment described herein, although other storage devices may also be used.

As noted above, the aqueous urea solution may react with various atmospheric components (e.g. water vapor, oxygen, etc.) under various conditions (e.g. applied heat, external heat, reduced atmospheric pressure, etc.), thereby decomposing and evolving ammonia vapor. Pressure relief valve 225 may be configured to open at a selected pressure, engine cycle or time interval, etc. to release at least some of the ammonia vapor from first storage device 220 into second storage device 230. Second storage device 230 may capture and store the ammonia vapor. Second storage device 230 may store the ammonia chemically, physically, or some combination thereof. The ammonia may be stored until controller 12 prompts the release of ammonia vapor from second storage device 230 into exhaust system 71. In one example second storage device 230 catalytically and/or physically holds ammonia and/or HNCO by a sorbent material, however, the device may include a void volume without a sorbent where NH3 can be stored in the gas phase under higher pressure.

Second storage device 230 may contain any suitable sorbent material for the storage of ammonia. For example, second storage device 230 may include a low temperature storage zeolite washcoat on a ceramic substrate. In another example, second storage device 230 may be a charcoal canister. Other examples of suitable sorbent materials may include but are not limited to molecular sieves (e.g. zeolites, alumina, silica, activated carbon, etc); oxides, carbonates, and hydroxides of alkali earth metals; and metal phosphates including but not limited to phosphates of titanium and zirconium. In one example, the ammonia may be adsorbed to a surface via chemical adsorption, or may be chemically and physically absorbed into material in the storage unit. In another example, an acidic sorbent material may be used to store NH3.

In one example, the concentration of ammonia in the gas passing through the unit 230 may drive the storage/release of ammonia. For example, when a higher concentration of ammonia at selected temperatures is passed through the unit 230 from unit 220, ammonia may be stored. However, when fresh air is passed through unit 230 ammonia may be released (and transported to the exhaust or to another storage location). In this way, temporary storage may be used to enable venting of gasses and thereby reduce pressure in the system, where the temporarily stored ammonia may then be recovered and used in the system.

Figure 3:
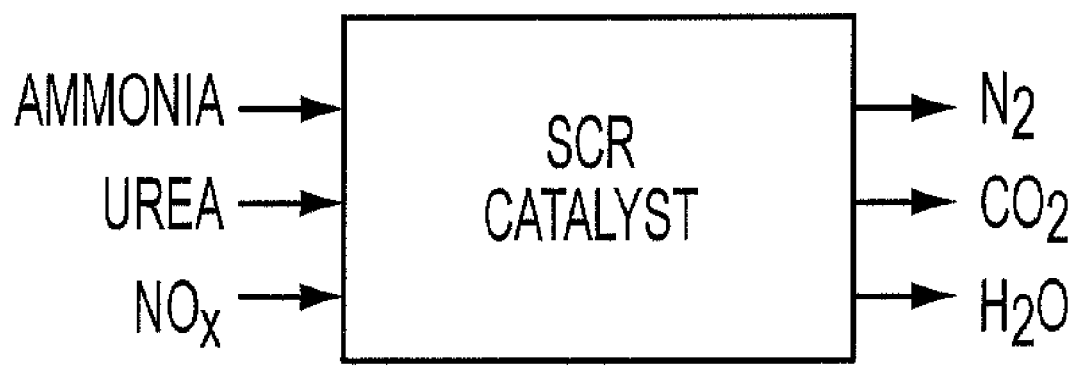
FIG. 3 shows a generalized schematic of the reduction of nitrogen oxides by ammonia and urea in an SCR process.

FIG. 3 schematically illustrates the reduction of nitrogen oxides by ammonia and/or urea in an example SCR process. Arrows pointing to the SCR catalyst represent chemical reagents while arrows pointing from the box represent products. Nitrogen oxides in the exhaust system 71 reacting with ammonia and/or urea in an SCR catalyst 72 may form more environmentally benign products such as nitrogen, carbon dioxide, and water for emission into the atmosphere. Some exemplary SCR reactions are as follows.

First, urea added to exhaust system 71 may decompose into ammonia as follows:

$$CO(NH_2)_2 \rightarrow NH_3 + HNCO$$

$$HNCO + H_2O \rightarrow NH_3 + CO_2$$

Ammonia may, in turn, react with NOx in SCR catalyst according to various different reaction pathways, including but not limited to one or more of the following:

$$4NO + 4NH_3 + O_2 \rightarrow 4N_2 + 6H_2O$$

$$2NO_2 + 4NH_3 + O_2 \rightarrow 3N_2 + 6H_2O$$

$$6NO_2 + 8NH_3 + \rightarrow 7N_2 + 12H_2O$$

$$NO + NO_2 + 2NH_3 \rightarrow 2N_2 + 3H_2O$$

It may be desirable to introduce an amount of one or more reductants, such as urea and/or ammonia, to exhaust system 71 generally derived from the above NOx reduction reaction stoichiometries or a look-up table stored in controller 12. In particular, the amount of urea and/or ammonia introduced to exhaust system 71 may be based on information from a sensor. For example, the output signal from a sensor in exhaust system 71, such as a NOx sensor, may indicate an amount of NOx in the exhaust. In another example, the output signal from a sensor in the reductant management system, such as an ammonia sensor, may indicate an amount of ammonia that may be purged from second storage device 230. As such, controller 12 may prompt reductant management system 73 to introduce an amount of urea and/or ammonia to exhaust system 71 accordingly. In doing this, urea and/or ammonia may be substantially consumed by the reduction of NOx in the exhaust at the SCR catalyst.

However, under some conditions it may be advantageous to mitigate ammonia slip. In particular, ammonia slip may be caused by introducing excessive amounts of urea and/or ammonia to exhaust system 71. Reductant management system 73 may regulate the reductants such that excessive amounts of urea and/or ammonia may be substantially prevented from entering exhaust system 71 (i.e. urea and/or ammonia entering the exhaust are mostly consumed by the reaction). By doing this, ammonia slip as result of at least uncontrolled ammonia release may be substantially reduced. Further examples of control of one or more reductant sources to the exhaust in response to operating conditions and sensor information are described in more detail below herein.

Figure 4:
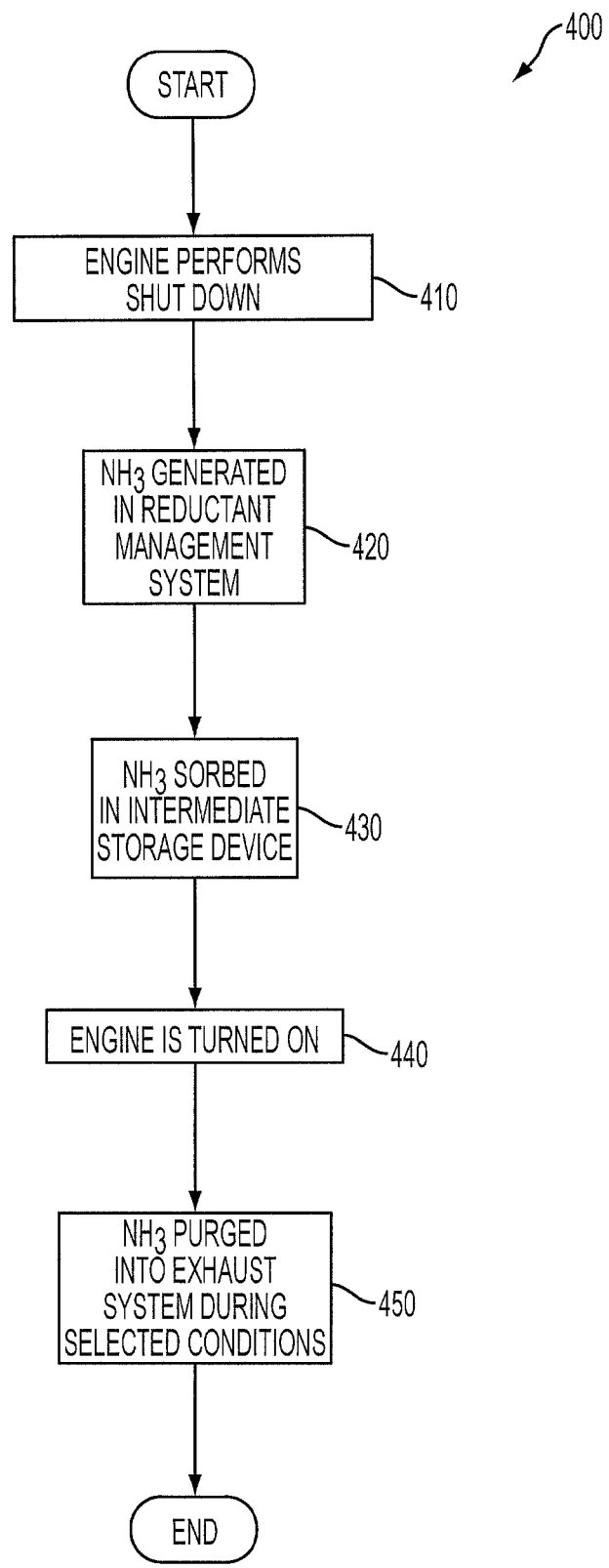
FIG. 4 is an embodiment of a method for operating an emission control system based on the operation state of the engine.

FIG. 4 may illustrate an embodiment of a sequence of operations that may be used to reduce ammonia slip. In particular, the storage and transport of urea and ammonia may be regulated by a method of operating reductant management system 73 that may be at least partially contingent on various engine conditions, and in particular based on engine shut-down conditions. For example, during engine-off conditions (which may include vehicle-off conditions, or vehicle operational conditions in the example of a hybrid-electric vehicle), ammonia slip may occur in some emission control systems as a result of ammonia released from a urea storage tank into the exhaust system (i.e. ammonia released into the exhaust is not reacted).

The example routine 400 illustrated in FIG. 4 shows a schematic representation of an example embodiment of emission control system operation that may manage ammonia in emission control system 200 to address ammonia generation during engine-off conditions. For example, ammonia may be generated due to external heat transferred to the ammonia/urea storage system. In one example, residual engine/exhaust heat in combination with ambient heat may cause production of ammonia vapor that raises vapor pressure. Such conditions may be addressed by storing vapor during the engine-off conditions to be later introduced in the exhaust for emission reduction.

First, at 410 the engine performs a shut-down wherein the shut-down may initiate a condition that may be referred to herein as engine-off condition. In one embodiment, the engine may be a combustion engine in a vehicle wherein the vehicle may be shut-down during the engine-off conditions. In another embodiment, the vehicle may use an electric motor or various other drive members (e.g. a fuel cell, etc.) during the engine-off condition of the combustion engine.

During the engine-off condition of the combustion engine, ammonia may be generated at 420 in the reductant management system in various ways. In particular, the urea may react with water and/or oxygen in the storage tank to produce ammonia at ambient temperature. Further, heat may facilitate the decomposition of urea to ammonia. As such, residual heat from previous operation of the engine may at least partially accelerate ammonia generation in the storage tank.

Referring back to FIG. 2, the reaction of stored urea may lead to elevated pressures of ammonia gas in first storage device 220 wherein first storage device 220 may be a urea storage tank. Pressure in the storage tank may be reduced by releasing the ammonia through line 74 to exhaust system 71 or through pressure relief valve 225 to second storage device 230 or some combination thereof. In particular, pressure relief valve 225 may be configured to open to relieve the vapor pressure in the storage tank under some conditions. For example, pressure relief valve 225 may open at a selected pressure. Returning to FIG. 4, ammonia may be sorbed at 430 in second storage device 230. For example, pressure relief valve 225 may be configured to open until the controller prompts the valve to close. As such, the concentration of ammonia from the storage tank may increase in second storage device 230 for at least a portion of the duration of the engine-off condition.

Then, at 440, the combustion engine is started. At 450, ammonia may be desorbed from second storage device 230 and purged into exhaust system 71 during selected engine/exhaust conditions. For example, after an engine speed run-up, and after the SCR catalyst reaches a selected operating temperature, stored ammonia may be purged into the exhaust and used to reduce NOx produced in the exhaust. In one example, at least one of the amount of purging or frequency of purging may be adjusted based on operation conditions, such as exhaust temperature, catalyst temperature, engine speed, engine load, or combinations thereof. Further, controller 12 may adjust or enable the purging of ammonia from second storage device 230 in response to various conditions. As one particular example, controller 12 may enable purging ammonia in response to a feedback signal from a temperature sensor wherein the temperature sensor may be disposed in the exhaust or the SCR catalyst downstream reductant management system 73. In another example, controller 12 may enable purging ammonia in response to a feedback signal an ammonia sensor that may detect the concentration of ammonia stored in second storage device.

In this way, it may be possible to address vapor generation during engine-off conditions, at least under selected conditions.

Referring now to FIGS. 5A-D, block diagrams demonstrate various reductant management modes that may be used, including storing, purging, etc. For example, a mode may include selectively transporting ammonia from at least one of first storage device 220 or second storage device 230 wherein ammonia transport may be facilitated by one or more vents/connections to atmosphere. Further, the atmospheric vent may be a relief valve that may relieve pressure or vacuum build-up (or may alternative between pressure and vacuum relief based on the desired effect) or may vary in response to the desired direction of transport of ammonia and/or urea. Specifically, as shown in FIG. 5A, reductant management system 73 may include a first atmospheric valve 510 that may be coupled to first storage device 220 (i.e. the urea storage tank) and/or a second atmospheric valve 520 that may be coupled to second storage device wherein either valve may be configured to relieve pressure or vacuum build-up or vary as described herein. The atmospheric valves may be configured to adjust the flow of atmospheric air into reductant management system 73 of FIG. 2 or to adjust the flow of vapor out of the system. It may be appreciated that reductants leaving reductant management system 73 of FIG. 2 may generally be routed to atmosphere and/or exhaust system 71. For example, urea may be optionally transported from the storage tank to the SCR during any suitable mode to at least partially supplement ammonia purged from second storage device or may be supplied alone.

Referring specifically to FIG. 5A, diagram 530 describes a path of reductant flow in reductant management system 73 wherein the flow may generally include the flow of ammonia vapor generated in the storage tank to second storage device 230. The path of flow described by diagram 530 may be referred to as a storage mode.

In one embodiment of storage mode described herein, NOx in the exhaust may be reduced in the SCR catalyst by liquid urea introduced to exhaust system at dashed arrow 75 from the storage tank. The stored urea may produce ammonia vapor that may be routed to second storage device 230 wherein the ammonia vapor may be stored in second storage device 230 until controller 12 may prompt a purging condition.

In another embodiment, controller 12 may not prompt the release of a reductant into exhaust system 71. For example, during engine-off conditions, urea and/or ammonia introduced to exhaust system 71 may result in ammonia slip. As such, urea may not be introduced to exhaust system 71. However, ammonia vapor generated in the storage tank as a result of residual engine heat, for example, may be routed to second storage device. In doing so, elevated vapor pressures may be reduced, although controller 12 may not prompt the release of reductants to exhaust system 71.

It may be advantageous to facilitate the transport of ammonia from the storage tank to second storage device 230 during a storage mode. For example, atmospheric valve 520 may be configured to open. In doing this, pressure build-up in second storage device 230 may be relieved such that the air leaving reductant management system 73 may be substantially free of ammonia and more ammonia vapor may enter second storage device 230 and be stored therein. In another example, atmospheric valve 510 may be configured to open at some pressure such that atmospheric air may be drawn into the storage tank. By doing this, vacuum within the storage tank may be relieved under some conditions, such as low ammonia generation during urea supply to the exhaust system.

Referring specifically to FIG. 5B, diagram 560 describes storage device purging operation with a flow path of reductants in reductant management system 73, where the flow may generally include the flow of ammonia vapor stored in second storage device 230 to exhaust system 71. Atmospheric valve 520 may be configured to open such that atmospheric air may be introduced into second storage device 230 wherein the atmospheric air may be introduced into second storage device 230 via a pressure differential, such as a venturi device at the entry point of ammonia vapor into exhaust system 71 or a pump. Further, the atmospheric air exiting second storage device may be at least partially saturated with ammonia vapor that may be introduced to exhaust system 71 for the selective and catalytic reduction of NOx.

During storage device purge as shown in FIG. 5B, urea in the storage tank may generate ammonia causing elevated ammonia vapor pressures within the tank. As such, purging operation may be ended so that vapors may again be stored in 230 based on pressure in 200. Also, the storage tank may preferentially be relieved by at least temporarily routing the vapor to second storage device 230 according to diagram 530 and/or introducing ammonia to exhaust system 71 according to the mode described by diagram 570.

In one example, the release of ammonia from second storage device 230 may be facilitated by heating the atmospheric air prior to introducing the air. For example, emission control system 200 may include a heating device (not shown) that may be disposed between atmospheric valve 520 and second storage device 230. In another example, emission control system 200 may route a portion of the hot exhaust such that the atmospheric air may be preheated.

Referring now specifically to FIG. 5C, diagram 570 describes a storage tank purge with a reductant flow path in reductant management system 73 where the flow may generally include the flow of ammonia vapor stored in the storage tank to exhaust system 71. Specifically, atmospheric valve 510 may be configured to open such that atmospheric air may be introduced into the storage tank to relieve vacuum caused by the release of ammonia from the storage tank to exhaust system 71 for the selective and catalytic reduction of NOx or due to temperature changes.

Referring specifically to FIG. 5D, diagram 580 describes a storage tank and device purge with a reductant flow path in reductant management system 73 where the flow may generally include the flow of ammonia vapor stored in the storage tank and in second storage device 230 to exhaust system 71. Atmospheric valve 510 and/or atmospheric valve 520 may be configured to open such that atmospheric air may be introduced into the storage tank and storage device 220 to relieve vacuum caused by the release of ammonia from the storage tank to exhaust system 71 for the selective and catalytic reduction of NOx or due to temperature changes.

Further, ammonia exiting the storage tank and the ammonia exiting second storage device 230 may intersect at junction 590 wherein a three-way valve may be disposed. As such, controller 12 may switch between the modes described by FIGS. 5A-B. Further, the valves described herein may be adjusted to control the flow of ammonia within emission control system 200.

Figure 6:
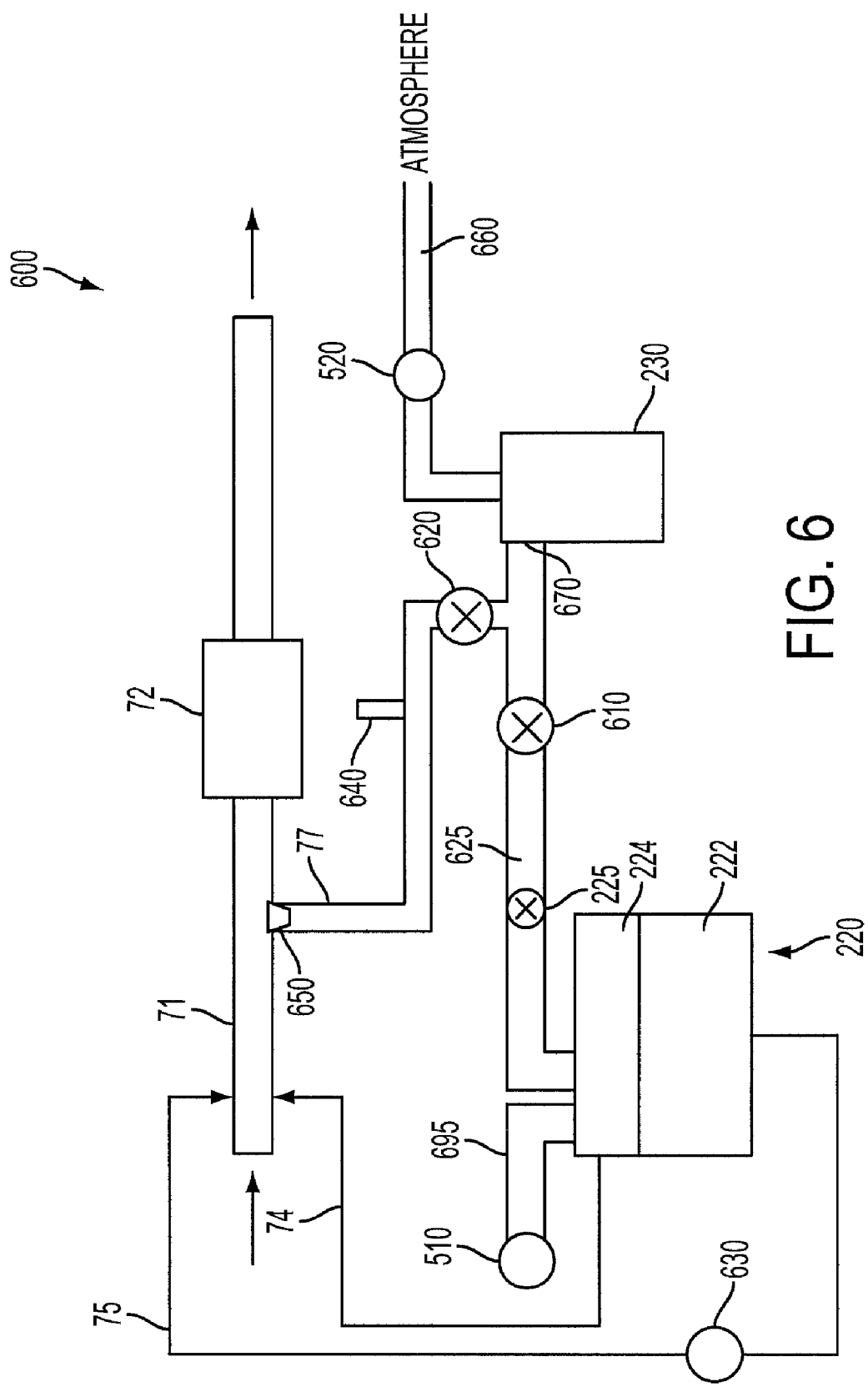
FIG. 6 describes an exemplary embodiment of a system for managing a liquid reductant and a gaseous reductant for use in an SCR process.
Figure 7:
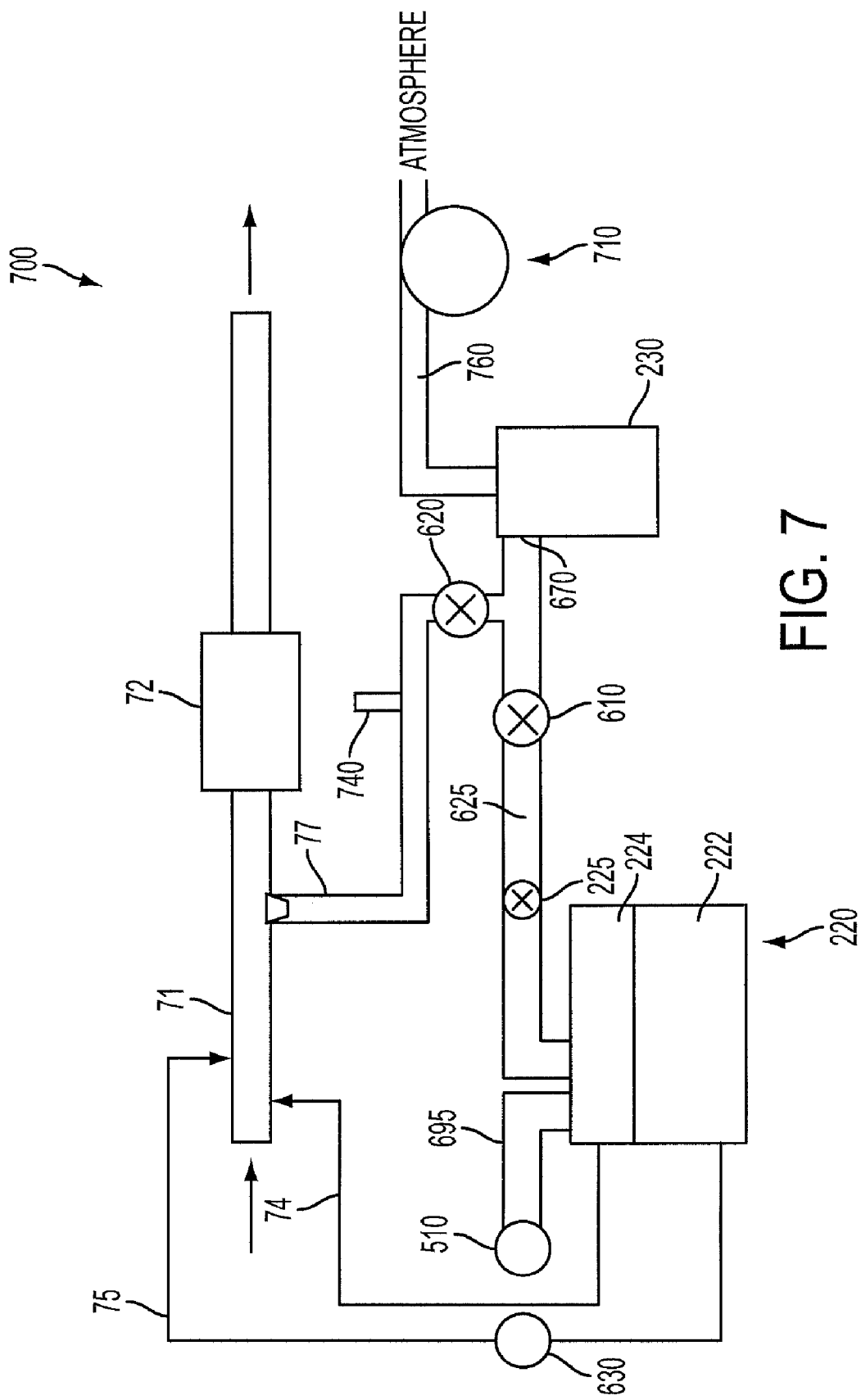
FIG. 7 describes another exemplary embodiment of a system for managing a liquid reductant and a gaseous reductant for use in an SCR process.
Figure 8:
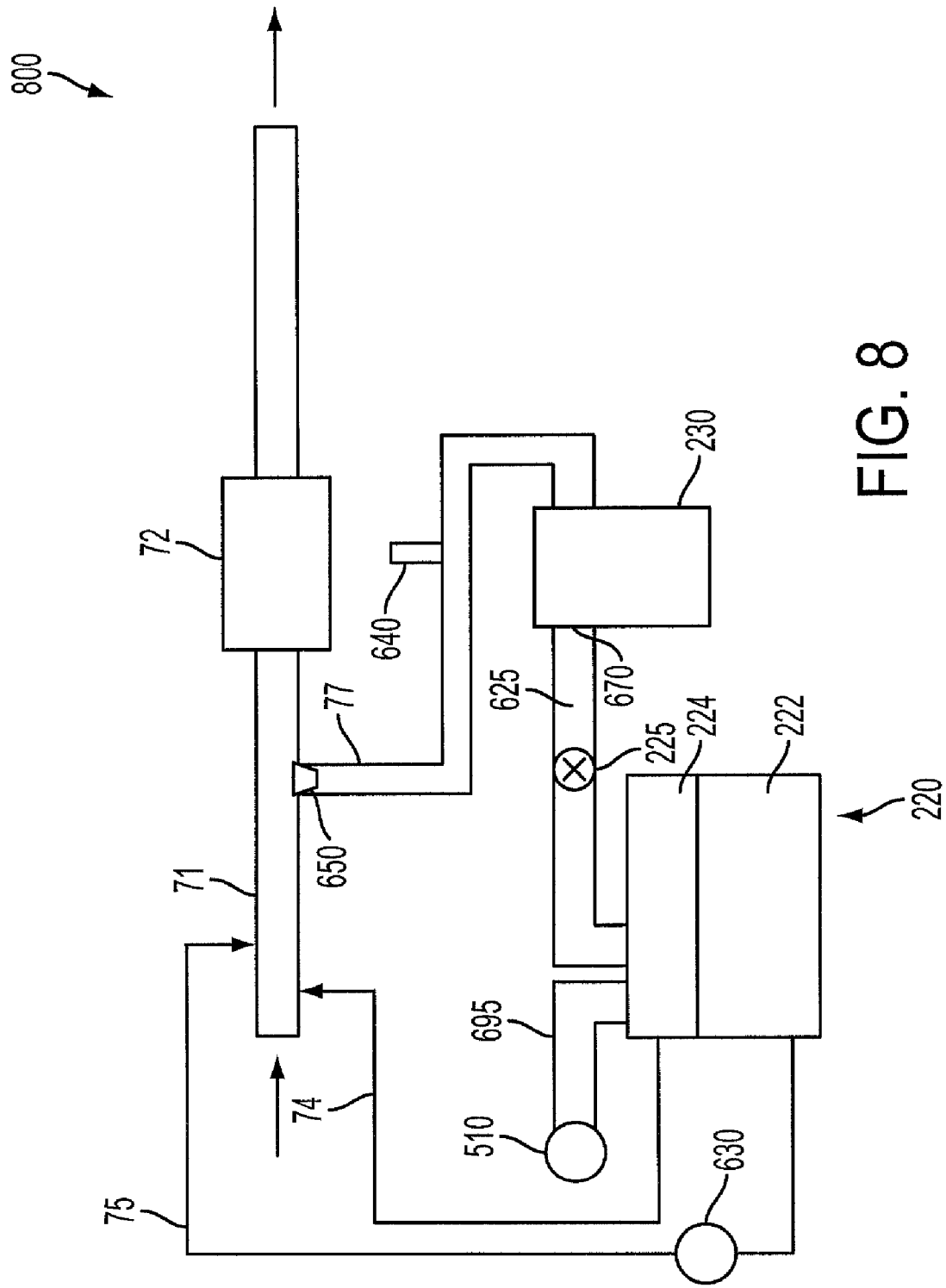
FIG. 8 describes yet another exemplary embodiment of a system for managing a liquid reductant and a gaseous reductant for use in an SCR process.

FIGS. 6-8 illustrate three exemplary embodiments of systems for managing a liquid reductant (for example, a urea solution) and a gaseous reductant (for example, ammonia gas evolved by the urea solution). These embodiments share various common components. For example, each of these exemplary embodiments includes first storage device 220 that stores first reductant 222, second storage device 230 that stores second reductant 224, and a conduit 625 having a one-way pressure valve 225 disposed fluidically between first storage device 220 and second storage device 230 that selectively releases second reductant 224 into second storage device 230 for later release into exhaust system 71. Additionally, a sensor 640 may be provided to measure a concentration of a gas-phase component within second reductant input 77, as described in more detail below. Further, each of the exemplary embodiments of FIGS. 6-8 includes atmospheric valve 510 to relieve pressure and/or vacuum within the storage tank and a fill channel 695 to allow the replenishment of first reductant 222. While conduit 625 is shown as directly connecting first storage device 220 and second storage device 230, it will be appreciated that conduit 625 may include intermediate structures. The term "conduit" is used herein to indicate a fluidic pathway between first storage device 220 and second storage device 230, which may encompass a plurality of different structures.

It will be appreciated that the operation of above-described components, as well as those components described below that are specific to approaches outlined in FIG. 6-8, may be controlled by controller 12 via the execution of code stored in memory 106, 108 on controller 12 by processor 102. It will further be appreciated that the specific embodiments described herein are merely exemplary, and that other embodiments may include only subsets of the structures described, and/or or any suitable additional structures not shown.

Referring now to the embodiment depicted in FIG. 6, reductant management system 600 includes, in addition to the structures described above, a storage valve 610 for regulating a flow of ammonia vapor into second storage device 230, and a purge valve 620 for regulating a flow of ammonia vapor from second storage device 230 into exhaust system 71.

In one embodiment, storage valve 610 may be maintained in a normally open position, while purge valve 620 may be maintained in a normally closed position. This state may be schematically illustrated by diagram 530 as storage mode. This allows excess ammonia vapor released through the one-way pressure valve 225 to be stored in second storage device 230. Then, under some conditions, such as elevated stored ammonia concentration in second storage device 230 or selected engine operating conditions, controller 12 may close storage valve 225 and open purge valve 620. This mode may be schematically illustrated by diagram 570 as storage device purge mode. Operation in storage device purge mode allows ammonia to be introduced into exhaust system 71 through purge valve 620 as follows. First, a venturi device 650 at the outlet of second reductant input 77 may create a low pressure zone, thereby causing a flow of atmospheric air through duct 660 and into second storage device 230. Air exiting the second storage device 230 at location 670 may include a significant partial pressure of ammonia vapor. The ammonia vapor in this air then may be drawn into the exhaust system 71 through second reductant input 77 via venturi device 650, where device 650 is in the exhaust pipe.

Referring now to the embodiment depicted in FIG. 7, reductant management system 700 includes, in addition to structures included in emission control system 600, an air pump 710. In this embodiment, the purge mode may include operating air pump 710 to cause a flow of atmospheric air through air duct 760 and into second storage device 230, in addition to closing storage valve 610 and opening purge valve 620. The flow of air caused by air pump 710 may transport ammonia from second storage device into exhaust system 71 via second reductant input. Due to the pressure differential created by air pump 710, venturi device 650 may be omitted from this embodiment. Further, compressed air from other sources in the vehicle may be used in addition to, or in place of, the air pump 710, such as compressed air from a turbine in the intake system of the engine.

Referring now to the embodiment depicted in FIG. 8, reductant management system 800 includes first storage device 220, second storage device 230, one-way pressure valve 630, vacuum valve 690, fill channel 695, and venturi device 650. However, reductant management system 800 does not include storage valve 610 and purge valve 610. Instead, valve atmospheric valve 510 associated with fill channel 695 may be selectively opened by controller 12 to permit the draw of air through first storage device 220 and second storage device 230 to thereby transport ammonia vapor into exhaust system 71 via a low pressure zone formed at venturi device 650. It will be appreciated that one-way pressure valve 630 may also be opened during such a purge process to ensure adequate air flow through second storage device 230.

The addition of urea and ammonia (or any other suitable reductant) to an exhaust system as disclosed above may be performed in a variety of manners. For example, controller 12 may include executable code to control the addition of suitable amounts of reductants to an exhaust system via any suitable system components, including but not limited to valves, pumps, injectors, etc.

In some embodiments the system may be configured to control the amounts added in response to feedback control. For example, in some embodiments, controller 12 may adjust amounts of the first reductant and the second reductant added to the exhaust system based upon feedback received from sensor 640. In some embodiments, sensor 640 may be an ammonia sensor, while in other embodiments sensor 640 may be a NOx sensor. Further, in yet other embodiments, both an ammonia sensor and a NOx sensor may be employed, along with any other suitable sensor or sensors. In yet other embodiments, controller 12 may be configured to determine concentrations of NOx based upon engine operating conditions, and/or may be configured to estimate a concentration of ammonia added to the exhaust system from second storage device 230 based upon variables such as a flow rate of air through the second storage device, etc.

Figure 9:
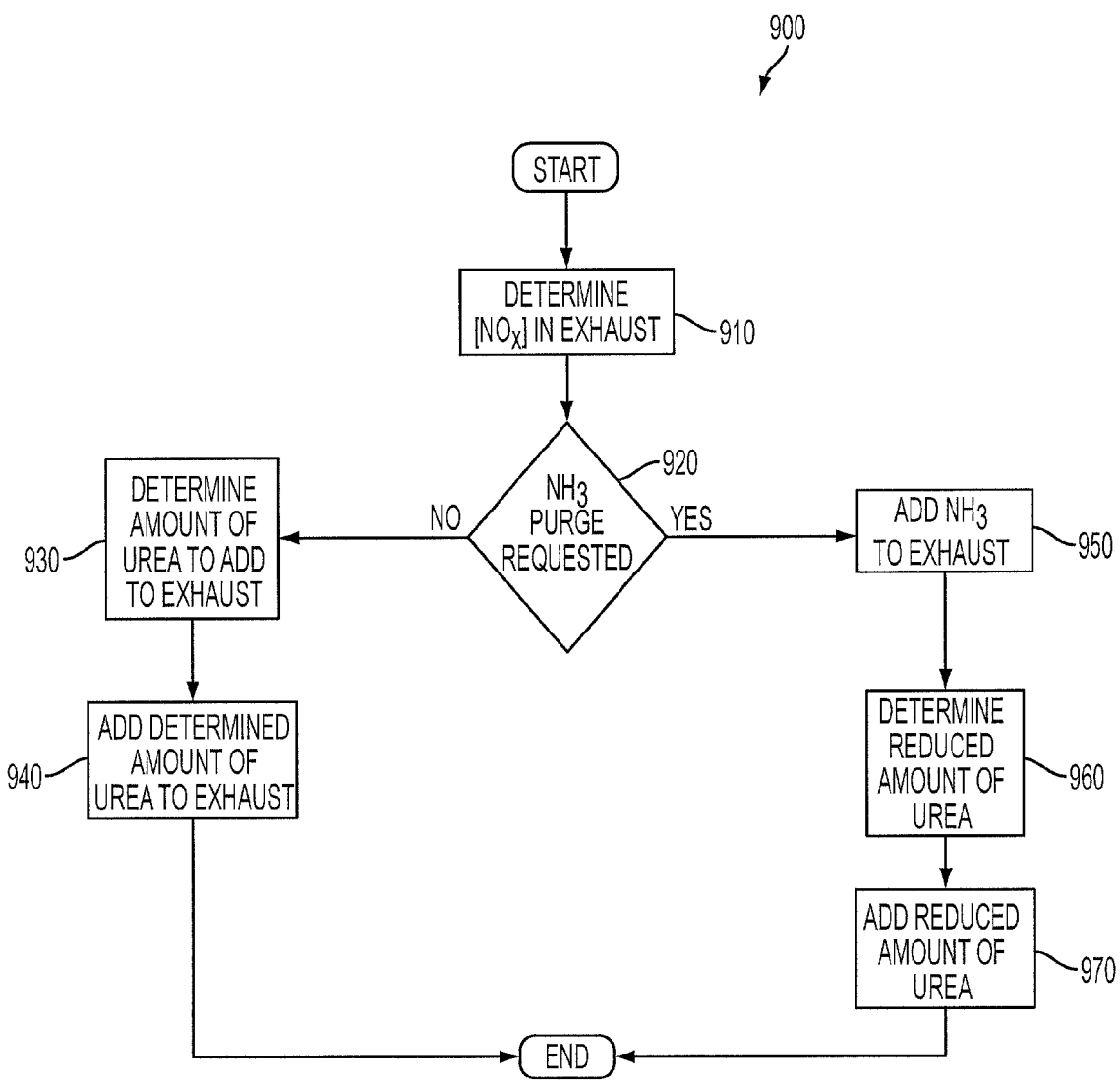
FIGS. 9-10 describes flow diagrams of exemplary embodiments of methods of determining the amount of a reductant agent to be added to an SCR process based on the amount of another reductant agent introduced and controlling the amount of urea supplied to exhaust system based on the amount of ammonia purged.

Referring now to FIG. 9, one exemplary embodiment of a method 900 for managing the addition of a plurality of reductants to an exhaust system is shown. Method 900 may be implemented in a variety of way, for example, in some embodiment's method 900 may be implemented by the execution of code stored on controller 12.

Method 900 first includes determining, at step 910, a concentration of NOx in the exhaust gases in exhaust system 71. Examples for determining the NOx concentration include, but are not limited to, receiving a signal from a NOx sensor, and/or determining an estimated NOx concentration from engine operating conditions such as speed and load. Further, the amount of NOx may be estimated in various forms, such as a level of NOx, a NOx concentration, and/or a NOx rate mass per volume of flow.

Next, method 900 includes determining, at step 920, whether an ammonia purge from second storage device 230 is requested. Various conditions or events may be used to determine when to request an ammonia purge. Examples include, but are not limited to, requesting a purge when a pressure of ammonia in second storage device 230 exceeds a threshold pressure, requesting a purge after a predetermined engine operating interval (for example, a time interval or a number of engine cycles), requesting a purge when engine operating conditions provide an opportunity to purge, and/or requesting a purge when an amount of reductant stored in 230 reaches a predetermined level, etc.

If no ammonia purge is requested, then method 900 proceeds to step 930 where an amount of urea to add to the exhaust is determined, and then to step 940 where the determined amount of urea is added to the exhaust via 75, for example. An amount of urea to add to the exhaust may be determined in a variety of ways. In some embodiments, controller 12 may receive an input from a NOx sensor indicating a concentration of NOx in the exhaust gases, and controller 12 may then determine and/or adjust from this input an amount of urea to add to the exhaust. In other embodiments, a concentration of NOx in the exhaust may be estimated from engine operating conditions, and a correlating amount of urea may be added to the exhaust system. In yet other embodiments, urea may be added to the exhaust system at a constant rate. The amount of ammonia to be added for a selected sensor input or engine operating condition may be calculated, or may be predetermined and stored in a look-up table on controller 12 and adjusted based on input operating conditions.

On the other hand, if an ammonia purge is requested, then method 900 proceeds to 950, at which ammonia is added to the exhaust system and a purge is performed. In embodiments where sensor 640 is an ammonia sensor, controller 12 may control or adjust the rate of ammonia addition to the exhaust system, for example, by controlling a flow of ammonia into the exhaust system. Alternatively, ammonia may be added to the exhaust system at a preselected rate.

As described above, in some embodiments, ammonia may be added to the exhaust system exclusive of any urea. In other embodiments, ammonia from the second storage device may be added to the exhaust system simultaneously with urea. Where ammonia from the second storage device is added to the exhaust system simultaneously with urea, method 900 may include determining and/or providing, at 960, a reduced amount of urea added to the exhaust system to accommodate the added ammonia while avoiding ammonia slip, and then adding the determined amount of urea to the exhaust system at 970.

The reduced amount of urea to be added to the exhaust system may be determined in a variety of ways. For example, controller 12 may determine the reduced amount of urea to be added to the exhaust by determining an amount or concentration of ammonia added to the exhaust system and also determining an amount or concentration of NOx in the exhaust gases from engine 10, and then determining how much urea to add to completely reduce all NOx in the exhaust gases. The amount of urea to add may be calculated from a function or functions derived from the NOx reduction reaction stoichiometries, or may be determined via a look-up table stored on controller 12. In this way, the amount of urea to be added to the exhaust may be adjusted in response to variation in an amount or concentration of ammonia added to the exhaust system, and/or variation in an amount or concentration of NOx in the exhaust gases from engine 10.

In this way, it may be possible to control reductant addition to the exhaust during a variety of conditions, and manage purging of ammonia vapors along with separate reductant delivery to achieved improved NOx reduction and reduce ammonia slip.

Referring back to FIGS. 5A-D, the modes of reductant management illustrate that liquid urea from the storage tank as indicated by dotted line 540 may be supplied independent to ammonia as in diagram 530 or may be supplied at least temporarily in parallel with ammonia from the storage tank as in 570 or at least temporarily in parallel with ammonia from second storage device as in 560 or some combination thereof. Further, ammonia from the storage tank may be supplied independently as in 570 or in parallel with ammonia from second storage device 230 as in 580 wherein urea may not be supplied (i.e. dotted line 540 may not apply).

Figure 10:
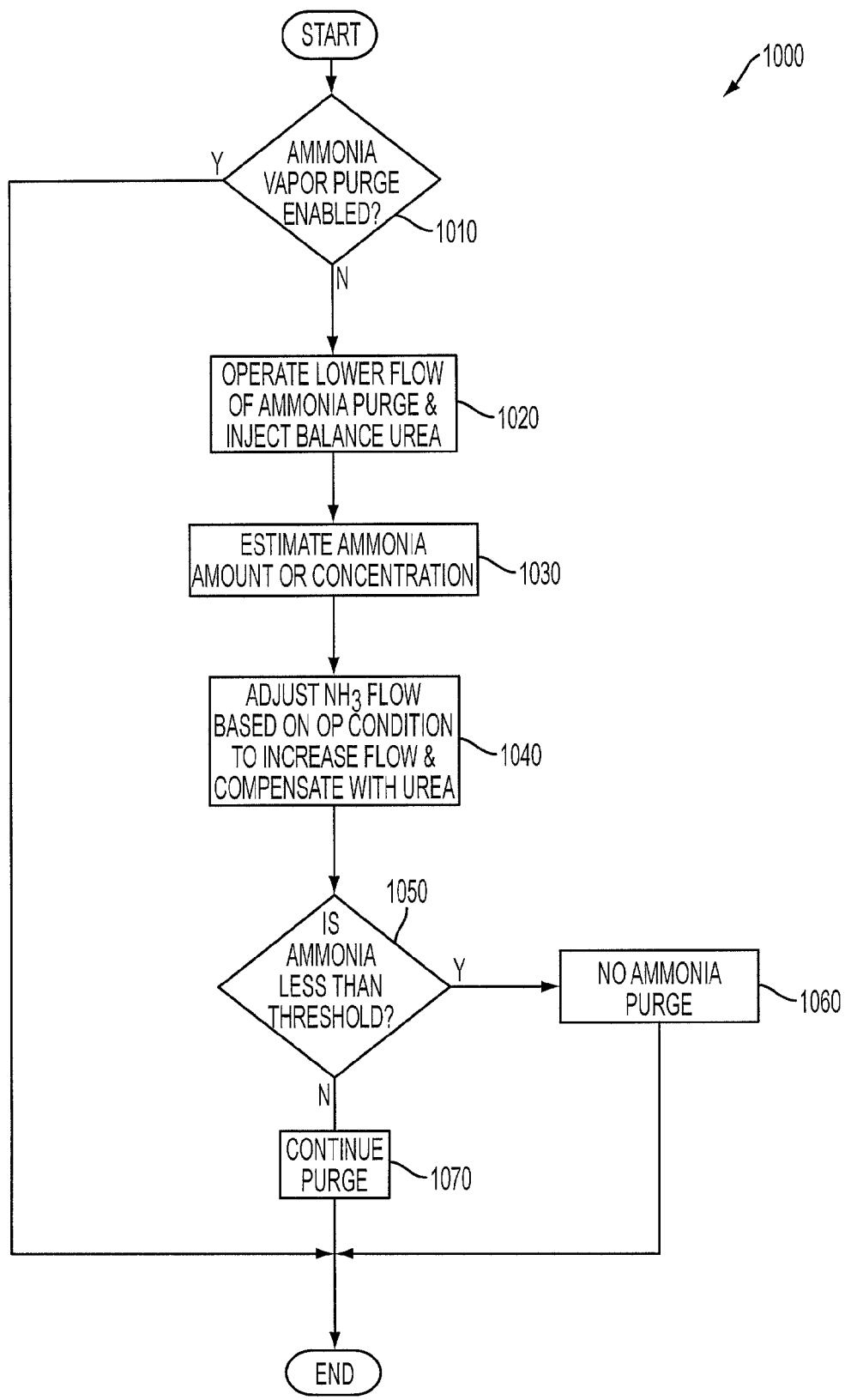

FIG. 10 is another flowchart 1000 of one embodiment that illustrates controlling the amount of urea supplied to exhaust system 71 based on the amount of ammonia purged from second storage device 230. As such, controller 12 may determine if an ammonia purge may be enabled at 1010, otherwise the routine may end. An ammonia purge may be enabled in response to various feedback signals from controller 12 as described herein. For example, controller 12 may prompt storage device to purge in response to the ammonia concentration in second storage device 230.

At 1020 the ammonia purge may be initiated at a lower flow level. As such, flow through conduit 625 may be reduced or partially blocked by a valve, such as storage valve 610. Further, a valve, such as purge valve 620 or a three-way valve at junction 590 may be configured to open such that ammonia may be purged to exhaust system 71. However, the ammonia flow from second storage device 230 may be substantially lower for an initial period or duration. During this condition, liquid urea may be introduced and/or adjusted (e.g., reduced) to exhaust system 71 to compensate for low ammonia flow in response to feedback from exhaust sensors, or sensors indicative of the amount of ammonia or other reductant being purged. In this way, adjustment of urea from the storage tank may account for ammonia vapor supply while ammonia flows from second storage device 230. Further, the compensation may be initially applied while the flow is lower to reduce the effect of errors in the estimate/measurement of how much ammonia is being purged. Then, once the state of the storage device 230 is learned, the flow may be increased as shown below.

Specifically, after some time or selected duration (or upon sufficient measurement of ammonia vapors being purged), at 1020, ammonia flow may enter a flow regime wherein ammonia may be released from second storage device at a higher flow. At this time, a sensor, such as sensor 640, may continue to detect the amount or concentration of ammonia released from second storage device 230. As such, at 1040, an amount of urea to supplement the amount of ammonia purged to exhaust system 71 may be determined and/or adjusted to exhaust system 71 via input 75.

At 1050, the routine may determine by a sensor coupled to second storage device 230, for example, the concentration of ammonia in second storage device 230. Controller 12 may determine whether the concentration of ammonia in second storage device 230 may exceed a threshold concentration. If no, the routine continue purging in 1070 and thus the process may repeat until the concentration in second storage device 230 may be less than the threshold ammonia concentration. If yes, the routine may continue to 1060 where the valves within emission control system 200 may be configured such that flow from second storage device 230 to exhaust system 71 may be reduced or blocked accordingly.

It may be appreciated that the order of processing described herein is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into a computer readable storage medium for the sensor, for example, in the engine control system.

The embodiments of systems and methods disclosed herein for managing a plurality of reductants used in an SCR process are exemplary in nature, and these specific embodiments are not to be considered in a limiting sense, because numerous variations are possible. The subject matter of the present disclosure includes all novel and non-obvious combinations and subcombinations of the various systems and methods for desulfating a $NO_x$ trap, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the various features, functions, elements, and/or properties disclosed herein may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle having an engine, comprising:
    during engine-off conditions, transferring vapors generated from decomposition of liquid ammonia stored in a first storage device and storing them in a second storage device;
    after said storing and during engine operation, purging said ammonia from the second storage device into engine exhaust flow by introducing air into the second device; and
    adjusting liquid reductant injection in the exhaust flow during and responsive to the purging.

2. The method of claim 1 further comprising providing tractive effort to drive the vehicle from an electric motor during said engine-off conditions.

3. The method of claim 1 wherein said vehicle is shut-down during said engine-off conditions.

4. The method of claim 1 wherein said purging comprises one or more of drawing said ammonia from the second device via a venturi and pumping air into the second device.

5. The method of claim 1 wherein said storing comprises storing said ammonia in a sorbent.

6. The method of claim 5 wherein said storing comprises storing said ammonia in a catalyst sorbent.

7. The method of claim 1 wherein said storing comprises storing said ammonia in a charcoal canister.

8. The method of claim 5, wherein said storing comprises venting a pressure to atmosphere.

9. The method of claim 1, wherein said adjusting includes adjusting an amount of the liquid reductant injected into exhaust flow based on an amount of ammonia purged into the exhaust flow.

10. The method of claim 1, further comprising reacting the purged ammonia at an SCR catalyst in the exhaust flow.

11. The method of claim 10, wherein said purging is enacted selectively, based at least partly on one or more of a catalyst temperature, an exhaust temperature, and an ambient temperature.

12. The method of claim 11, wherein said purging is enacted selectively based at least partly on a rate of the exhaust flow.

13. The method of claim 1, wherein said purging is enacted selectively based at least partly on an amount of ammonia stored in the second device.

14. The method of claim 1 wherein said storing comprises storing said ammonia in a sorbent, and said purging is enacted selectively based at least partly on an amount of ammonia stored in the sorbent.

15. The method of claim 14 wherein said storing comprises storing said ammonia vapors in a zeolite catalyst.

16. The method of claim 1 wherein said storing includes storing ammonia generated due to ambient heat and/or residual engine heat from a previous vehicle operation.

17. A method for a vehicle, comprising:
    during engine-off, transferring vapors generated from decomposition of liquid ammonia stored in a first storage device due to ambient temperature changes, and storing them in a second storage device;
    after said storing and during engine operation, purging said ammonia from the second storage device into engine exhaust flow by introducing air into the second device; and
    adjusting liquid reductant injection in the exhaust flow during and responsive to the purging.

18. A method for a vehicle, comprising:
    during engine-off, transferring vapors generated from decomposition of liquid ammonia stored in a first storage device due to ambient temperature changes, and storing them in a second storage device;
    after said storing and during engine operation, purging said ammonia from the second storage device into engine exhaust flow by introducing air into the second device; and
    adjusting liquid reductant injection in the exhaust flow responsive to ammonia storage amounts.

* * * * *